US008880991B2

(12) United States Patent
Mondal et al.

(10) Patent No.: US 8,880,991 B2
(45) Date of Patent: Nov. 4, 2014

(54) METHODS AND APPARATUS FOR IMPROVED BROWSING PERFORMANCE BY PRECOMPILATION OF HIGH-PRIORITY JAVASCRIPTS IN A WEBPAGE AND DELAYING THE REMOVAL OF CORRESPONDING COMPILED CODE

(75) Inventors: Shyama Prasad Mondal, San Diego, CA (US); Subrato K. De, San Diego, CA (US); Dineel D. Sule, San Diego, CA (US); Mark Bapst, South Barrington, IL (US); Kun Zhang, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 537 days.

(21) Appl. No.: 13/091,538

(22) Filed: Apr. 21, 2011

(65) Prior Publication Data

US 2012/0272132 A1    Oct. 25, 2012

(51) Int. Cl.
  *G06F 17/00*   (2006.01)
  *G06F 17/30*   (2006.01)
  *G06F 12/02*   (2006.01)

(52) U.S. Cl.
  CPC ...... *G06F 17/30899* (2013.01); *G06F 12/0253* (2013.01)
  USPC ............................. 715/205; 715/234; 715/235

(58) Field of Classification Search
  CPC ........................ G06F 12/0253; G06F 17/30899
  USPC .......................................... 715/205, 234, 235
  See application file for complete search history.

(56) References Cited

U.S. PATENT DOCUMENTS

| 6,360,273 B1* | 3/2002 | Beurket et al. ............... 709/244 |
| 6,961,901 B1* | 11/2005 | Colson .......................... 715/234 |
| 7,228,500 B2* | 6/2007 | Calvert et al. ................. 715/234 |
| 7,765,248 B2 | 7/2010 | Kanasaki |
| 2002/0194211 A1* | 12/2002 | Subramanian et al. ....... 707/500 |
| 2003/0236771 A1* | 12/2003 | Becker ............................. 707/2 |
| 2006/0015810 A1* | 1/2006 | Calvert et al. ................. 715/517 |

(Continued)

OTHER PUBLICATIONS

Ferrandez, Tess, "Background Garbage Collection in CLR 4.0", Webpage located at http://blogs.msdn.com/b/tess/archive/2009/05/29/background-garbage-collection-in-clr-4-0.aspx downloaded Sep. 20, 2012, Publisher: Microsoft (MSDN), Published in: US, 05/2912009, pp. 5.

(Continued)

*Primary Examiner* — Stephen Hong
*Assistant Examiner* — Marshon Robinson
(74) *Attorney, Agent, or Firm* — Neugeboren O'Dowd PC

(57) ABSTRACT

Methods and apparatus for processing scripting-language code in webpages are disclosed. The method includes obtaining scripting-language code that is utilized by a higher-priority webpage, compiling the scripting-language code to generate higher-priority compiled code objects, storing the higher-priority compiled code objects on a communication device, distinguishing the higher-priority compiled code objects from other compiled code objects that are stored on the communication device to delay the higher-priority compiled code objects from being removed from the communication device, and executing the higher-priority compiled code objects when the webpage is requested by the user. In many variations, this approach is not applied to all webpages visited, but only on certain webpages and scripts that are considered high priority, either implicitly or explicitly, based on a priority function that computes a multi-level priority from the history and past browser activity.

36 Claims, 3 Drawing Sheets

(56) References Cited

U.S. PATENT DOCUMENTS

| | | | | |
|---|---|---|---|---|
| 2007/0118796 | A1* | 5/2007 | Nazem et al. | 715/513 |
| 2007/0162498 | A1 | 7/2007 | Mishra | |
| 2008/0133517 | A1 | 6/2008 | Kapoor et al. | |
| 2010/0023582 | A1 | 1/2010 | Pedersen et al. | |
| 2010/0115388 | A1* | 5/2010 | Nguyen | 715/205 |
| 2010/0262780 | A1* | 10/2010 | Mahan et al. | 711/118 |
| 2010/0293206 | A1* | 11/2010 | Ylonen | 707/813 |
| 2011/0131341 | A1* | 6/2011 | Yoo et al. | 709/237 |
| 2011/0219035 | A1 | 9/2011 | Korsunsky et al. | |
| 2011/0239200 | A1* | 9/2011 | Binsztok | 717/140 |
| 2012/0066586 | A1* | 3/2012 | Shemesh | 715/235 |
| 2012/0221930 | A1* | 8/2012 | Nguyen | 715/206 |
| 2012/0226972 | A1* | 9/2012 | Fainberg et al. | 715/234 |
| 2012/0260181 | A1 | 10/2012 | Sule et al. | |
| 2012/0297291 | A1* | 11/2012 | Fainberg et al. | 715/234 |

OTHER PUBLICATIONS

"Garbage Collection in V8; for mobile and beyond", Webpage located at http://ajaxian.com/archives/garbage-collection-in-v8-for-mobile-and-beyond downloaded Sep. 20, 2012, Publisher: Ajaxian, Published in: US, May 13, 2010, pp. 6.

"Garbage Collection", Webpage located at http://msdn.microsoft.com/en-us/library/0xy59wtx.aspx downloaded Sep. 20, 2012, Publisher: Microsoft (MSDN) Published in: US, 2012, pp. 2.

"Garbage Collection", Webpage located at https://developer.palm.com/content/index.php?id=4562 downloaded Sep. 20, 2012, 2011, Publisher: Hewlett-Packard Development Company, L.P., Published in: US, pp. 9.

"Garbage Collection", Webpage located at https://developer.palm.com/content/resources/develop/garbage_collection.html downloaded Sep. 20, 2012, Publisher: Hewlett-Packard Development Company, L.P., Published in: US, 2011, pp. 9.

Goldshtein, Sasha, "Garbage Collection Notifications in .NET 3.5 SP1", Webpage located at http://blogs.microsoft.co.il/blogs/sasha/archive/2008/08/25/garbage-collection-notifications-in-net-3-5-sp1.aspx downloaded Sep. 20, 2012, Aug. 25, 2008, pp. 5.

Kero, Martin, et al., "Scheduling Garbage Collection in Real-Time Systems", CODES+ISSS '10, Oct. 24-29, 2010, Scottsdale, Arizona, USA, Publisher: ACM, Published in: US, pp. 10.

Mandelin, David, "JavaScript speedups in Firefox 3.6", Webpage located at http://hacks.mozilla.org/2010/01/javascript-speedups-in-firefox-3-6/ downloaded Sep. 20, 2012, Publisher: Mozilla, Published in: US, Jan. 13, 2010, pp. 18.

Matura, Digvijay, "Garbage.Collector—4.0" webpage located at http://dotnetharbour.blogspot.com/2010/05/garbagecollector-40.html, downloaded Sep. 20, 2012, May 14, 2010, pp. 4.

"Parallel and concurrent garbage collectors", Webpage located at http://chaoticjava.com/posts/parallel-and-concurrent-garbage-collectors/ downloaded Sep. 20, 2012, Published in United States, Jan. 8, 2012, pp. 8.

Stephens, Maoni, "So, what's new in the CLR 4.0 GC?", Webpage located at http://blogs.msdn.com/b/maoni/archive/2008/11/19/so-what-s-new-in-the-clr-4-0-gc.aspx downloaded Sep. 20, 2012, Nov. 19, 2008, Publisher: Microsoft (MSDN), Published in: US, pp. 8.

Stephens, Maoni, "Using GC Efficiently—Part 1", Webpage located at http://blogs.msdn.com/b/maoni/archive/2004/06/151156626.aspx downloaded Sep. 20, 2012, Publisher: Microsoft (MSDN), Published in: US, Jun. 15, 2004, pp. 19.

Fisher, Darin, "Link Prefetching FAQ" Webpage located at https://developer.mozilla.org/en-US/docs/Link_prefetching_FAQ downloaded Jan. 4, 2013, Mar. 3, 2003, Publisher: Mozilla Published in: US, p. 4.

"Optimize Caching" webpage located at https://developers.google.com/speed/docs/best-practices/caching downloaded on Jan. 4, 2013, Mar. 28, 2012, Publisher: Google Published in: US, p. 6.

Souders, Steve, "Call to Improve Browser Caching" webpage located at http://www.stevesouders.com/blog/2010/04/26/call-to-improve-browser-caching/ downloaded Jan. 4, 2013, Apr. 26, 2010, Publisher: Steve Souders, Published in: US, p. 6.

""The Chromium Projects", webpage located at http://dev.chromium.org/developers/design-documents/dns-prefetching downloaded Dec. 7, 2012, Publisher: Google Sites, Published in: US, p. 4."

Zhang, Kaimin, et al., "Smart Caching for Web Browsers" downloaded Jan. 4, 2013, Apr. 30, 2010, Publisher: International World Wide Web Conference Committee Published in: US, p. 10.

* cited by examiner

METHODS AND APPARATUS FOR IMPROVED BROWSING PERFORMANCE BY PRECOMPILATION OF HIGH-PRIORITY JAVASCRIPTS IN A WEBPAGE AND DELAYING THE REMOVAL OF CORRESPONDING COMPILED CODE

FIELD OF THE INVENTION

The present invention relates to computing devices. In particular, but not by way of limitation, the present invention relates to processing of web content on mobile devices including tablets.

BACKGROUND OF THE INVENTION

More and more websites are utilizing ECMAscript-based scripting languages (e.g., JavaScript or Flash) in connection with the content that they host. For example, JavaScript-based content is ubiquitous, and JavaScripts are run by a JavaScript engine that may be realized by a variety of technologies including interpretation-type engines, HotSpot just-in-time (JIT) compilation (e.g., trace based or function based), and traditional-function-based JIT compilation where native code is generated for the entire body of all the functions that gets executed. The HotSpot JITs can employ two mechanisms: (i) interpret the less frequently executed code, and compile to native the most frequently executed code; (ii) do a lightweight and less optimized compile for less frequently executed code, and a heavy and optimized compile for the most frequently executed code.

Interpretation directly involves running the script over a software layer, called an interpreter, which handles the execution of the Scripts by mapping script operations to native code functions implemented in native processor ISA and that runs on processor hardware. Because pure interpretation is slow, most of the current JavaScript engines (e.g., JSC/Nitro, V8, Tracemonkey, and the 1E9 JavaScript engine) used in browsers are using one form of the JIT technology or the other.

JIT-based engines compile the scripts at runtime to native code, and then the native code is executed on the processor hardware. As a consequence, a browser that uses a JIT-based JavaScript engine compiles and executes each piece of JavaScript code as soon as the code is found while parsing the HTML file. And in general, evaluation of JavaScripts forms a large part of browser's overall page load time. For example, if networking delays are not considered, 30% of the page load time may be due to the evaluation of JavaScripts. For a traditional function based JIT JavaScript engine, one-third of the evaluation time for a JavaScript may be due to compilation and the remainder due to execution of the compiled code.

As a consequence, improved apparatus and methods that reduce the time associated with scripting-language processing are desired.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a method for processing webpages. The method may include obtaining scripting-language code that is utilized by a webpage, and compiling the scripting-language code in advance of a user requesting the webpage so as to generate precompiled code. The precompiled code is then stored on a communication device and distinguished from other compiled code that is stored on the communication device so as to delay the precompiled code of high-priority scripts from being removed from the communication device's memory system, and the precompiled code is then executed when the webpage is requested by the user. It should be noted that the precompiled code referred to herein is generally compiled scripting-language code that is persistently stored so that when a user requests a webpage, the scripting-language code does not have to be compiled again.

Embodiments of the invention may also be characterized as a communication device that includes a user interface that enables a user to request a webpage, and the communication device includes a web browser that generates a request for the webpage responsive to the user requesting the webpage. In addition, the communication device in these embodiments includes a preemptive compilation component that initiates a precompilation of selected scripting-language source codes that are part of the webpage before the webpage is requested so as to generate compiled code in advance. The preemptive compilation component then initiates storage of the precompiled code so that the precompiled code remains stored on the communication device during instances when the precompiled code would ordinarily be removed, and the web browser renders the webpage using the precompiled code. In many implementations, the pre-emptive compilation component initiates the compilation by a JavaScript engine and then the JavaScript engine saves the compiled code in compilation cache. When the user visits the webpage in a web browser the next time, the JavaScript engine takes the compiled code from compilation cache.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In several embodiments of the present invention, the time it takes to load webpages is substantially reduced by pre-compiling scripting-language code (e.g., JavaScript code) in those webpages. In some modes of operation for example, scripting-language code in commonly visited web sites is precompiled, and the generated compiled code is retained so that the browser can directly execute the available precompiled code without spending time to compile the scripting-language code. In some variations of the invention, the precompiled code is stored in the heap that is managed by a JavaScript engine in such a way that the garbage collection operation of the JavaScript engine does not remove, or delays removal, of the precompiled code. In other variations, the precompiled code is stored in a memory location that is either not prone to memory management operations (that clear memory) or the memory location may be managed to allow the precompiled code to be persistently stored.

For convenience, many embodiments and operational aspects of the present invention are described in the context of JavaScript code that is processed by one or more varieties of JavaScript engines that compile JavaScript code, but the methodologies and inventive constructs described herein are certainly applicable to other types of code (e.g., both existing and yet to be developed coding schemes) that are compiled during runtime.

Figure 1:
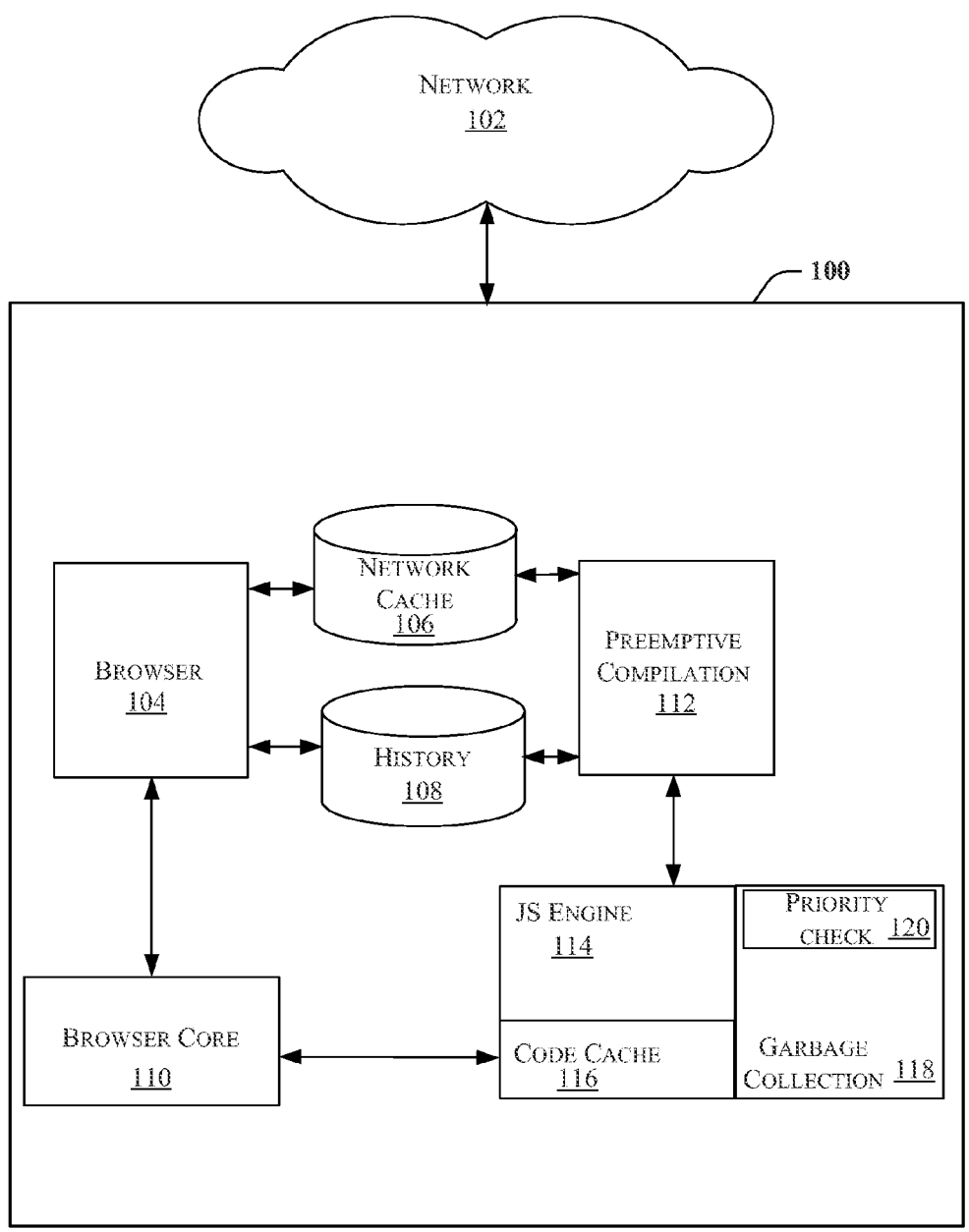
FIG. 1 illustrates a block diagram of a communication device according to several embodiments.

Referring first to FIG. 1, shown is a block diagram depicting an exemplary communication device 100 in which many embodiments of the present invention may be implemented. As shown, the communication device 100 is generally configured to communicate via a network 102 to remote web servers or proxy servers (not shown) to receive and display content (e.g., webpages) for a user of the communication device 100. The communication device 100 may be realized by a wireless communications device (WCD) such as a smartphone, PDA, netbook, tablet, laptop computer and other wireless devices. But the communication device 100 may work in tandem with wireline and wireless communication devices. The network 102 may include the Internet, local area networks, cellular networks (e.g., CDMA, GPRS, and UMTS networks), WiFi networks, and other types of communication networks.

As depicted, the communication device 100 in this embodiment includes a browser 104 that is in communication with a network cache 106, a history store 108, and a browser core 110. In addition, a preemptive compilation component 112 is in communication with the network cache 106, the history store 108, and a scripting-language engine, which in this embodiment is depicted as a JavaScript engine 114. And as shown, the browser core 110 is in communication with the JavaScript engine 114. The JavaScript engine 114 in this embodiment includes a code cache 116 and a garbage collection component 118 that is adapted to include a priority check component 120.

The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system. For example the JavaScript engine 114 and the preemptive compilation component 112 may be closely integrated with the browser core 110.

The browser 104 depicted in FIG. 1 represents high level browser components that carry out operations associated with typical browsers including components that provide a user interface, enable bookmarking and cookie management, provide management of web page history (stored in the history store 108), and management of the network cache 106. The browser 104 may be realized by a variety of different types of browsers known to those of ordinary skill in the art including Safari, Explorer, Chrome, and Android browsers.

The network cache 106 generally operates as a cache of content (e.g., images, video, and text) that has been received via the network 102, but is stored locally on the communication device 100. And the history store 108 includes a listing of websites visited by the browser 104, which as discussed further herein, is utilized in connection with the network cache 106 to identify and obtain JavaScripts that are most likely to be requested in the future. And as one of ordinary skill in the art will appreciate, the browser core 110 generally operates as a typical browser core to parse, render, and composite webpage content for presentation to the user of the communication device 100. In some embodiments for example, the browser core 110 may be realized by a WebKit browser core, but this is certainly not required and other types of browser cores may be utilized.

In general, the preemptive compilation component 112, in connection with the JavaScript engine 114, operate to precompile JavaScript code, in advance of a user initiating compilation of the JavaScript code, and the JavaScript Engine 114 initiates persistent storage of the compiled code, for a sufficiently long time, so that when the user actually visits the website that includes the JavaScript code, the JavaScript code does not need to be compiled; thus decreasing page-load times and improving the user's experience. Hence, even when the browser 104 is not being used and stays idle, the precompiled script code object survives according to several aspects of the present invention.

But the time-to-live information of the JavaScript code that is available as precompiled code is assessed, and if the JavaScript's time-to-live information indicates the JavaScript has expired, both the stringified form of the JavaScript and the corresponding compiled code objects are discarded. This process of discarding precompiled code objects that are associated with expired stringified code is carried out because the precompiled code object is no longer valid for further use and new JavaScript needs to be downloaded and compiled. If the time-to-live of the script has not expired, the corresponding precompiled code object survives in the storage for future execution as long as the browser process is alive. In some modes of operation, the preemptive compilation component 112 may operate as a background process to initiate precompilation of cached JavaScripts while the communication device 100 and/or the browser 104 are idle. For example, when the communication device 100 is idle for a threshold period of time (e.g., when charging at night and the user is sleeping), JavaScripts may be precompiled so that the communication device 100 is ready when the user visits a webpage after the idle period. Alternatively, the preemptive compilation component 112 may initiate the precompilation of JavaScript code during a start-up process of the browser when the browser 104 is first launched.

In many modes of operation, the preemptive compilation component 112 selects the JavaScript code to precompile based on either an implicit or explicit prioritization. The priority can be explicitly computed based on different factors such as the frequency that webpages have been requested in the past, the most frequently or most recently visited webpages, or can be implicitly based on a specific characteristic. For example, one specific characteristic may be the likelihood that a script will be shared among different webpages. By way of specific example without limitation, script libraries such as jQuery, mjs, sylvester.js, glMatrix.js are more likely shared among different webpages; thus the priority of these scripts may have a higher priority than the other script resources in the particular web page. But it should be recognized that these script libraries are merely examples, and it is certainly contemplated that other script libraries may be prioritized at a higher level based upon use across multiple webpages.

These priority values can be multi-leveled (e.g., greater than or equal to two) and if explicitly computed, can be based on certain functions such as the most frequently visited, or most recently visited webpages, etc. As shown, the preemptive compilation component 112 may access the history store 108 to determine the frequency that webpages have been requested, or determine which webpages have been visited most recently, and utilize that information to identify the list of JavaScript code in the more frequently requested webpages or most recently requested webpages to be precompiled.

In many embodiments, the number of priority websites and script resources in them (determined by frequency, regency, and/or some other function) to be considered for precompilation is automatically configured based on an amount of memory allocated to the browser 104 in the system, and the explicit or implicit multi-level (>=2 levels) priority mechanism helps in this auto adjustment mechanism. For example, if less memory is available for storing the precompiled code, the lower priority precompiled code objects may be allowed to be garbage collected (i.e., removed from storage). An actual number of the top list of commonly-visited web sites that are considered for precompilation of JavaScripts can thus be a dynamic value that is obtained by computing the expected size of the precompiled code and the amount of space available in the network cache 106 to save the script resources and the dependency information.

In addition to prioritizing webpages, differential priorities may be assigned to the script resources within a particular webpage. As an example, when certain scripts (e.g., commonly used script libraries such as jQuery, mjs, sylvester.js, glMatrix.js) are shared among different webpages, the priority of the commonly shared scripts may be a higher priority than the other script resources in the particular web page.

As one of ordinary skill in the art will appreciate, the JavaScripts from an HTML file have to be compiled in the order of dependency. The dependency among JavaScripts of a specific website can be maintained by the network cache 106 because it will have a separate entry for all sub-resources including JavaScripts. This dependency information can also impact the individual implicit or explicit priority values of the script resources within a particular web page.

In addition to frequency, the time-to-live (TTL) of the JavaScript code may also be a factor that is considered before JavaScript code is precompiled. If for example, a particular webpage and its corresponding JavaScript code are about to expire (based upon its TTL), the preemptive compilation component 112 may not precompile the JavaScript. In addition, operational constraints of the JavaScript engine heap may also be a factor that is used to determine whether a particular JavaScript is precompiled. For example, if there are substantial size constraints upon the code cache 116, the preemptive compilation component 112 may only precompile JavaScripts in the top few most frequently requested webpages (e.g., the webpages that are very high in the priority list). In many embodiments, the JavaScript resources for the commonly-visited webpages are persistently stored in the network cache 106 so that the JavaScript resources are retained across power cycles, and in addition, TTL stamps are maintained on the JavaScript resources so that the preemptive compilation component 112 may prompt the JS engine 114 to update that code cache 116 if any of the cached JavaScript (e.g., in the network cache 106) has expired so that it can garbage collect the corresponding compiled code and decisions about whether to precompile the code at all (as discussed above) may be made.

As one of ordinary skill in the art will appreciate in light of the present disclosure, the preemptive compilation component 112 may be realized by adding additional functionality to the browser 104, the browser core 110, and/or the JavaScript engine 114. The JavaScript engine 114 in some embodiments may be realized as a V8 JavaScript engine, but this is merely an example, and other types of scripting-language engines may be utilized in connection with embodiments of the present invention.

In the context of a lazy JIT compiler (e.g., a V8 compiler) a bulk of the code gets lazily compiled when the parent code is executed. Thus preemptive compilation gets the top level scripts compiled, but may not trigger lazy compilation. It is the execution of the precompiled scripts or whenever a webpage is first visited that will trigger Lazy compilation and create the JIT code for script portions that get lazily compiled. Hence the method of tracking the priority is also applied to the lazily compiled JIT codes that are created during the first visit of the website, and are protected from being removed (garbage collected). This ensures that during subsequent visits the lazily compiled code also remains in the compilation/code cache, leading to much improved page loading time.

As discussed further herein, the precompiled JavaScript in the embodiment depicted in FIG. 1 is stored in the code cache 116 along with other cached code, but the precompiled JavaScript code is distinguished from the other compiled code objects so that removal of the precompiled code is delayed long enough so that in many instances the precompiled code is available and utilized when a user points the browser 104 to a webpage. In many variations of the embodiment depicted in FIG. 1, for example, the precompiled code is assigned an explicit priority indicator and stored in the code cache 116 in connection with the explicit priority number so that the priority check component 120 is able to distinguish the precompiled code from other code (e.g., non-priority compiled code objects) and prevent or delay the garbage collection component 118 from removing the precompiled code from the code cache 116. As discussed above, in some variations of the present invention the explicit priority indicator is a function of the frequency that a webpage is accessed and/or how recently the webpage was accessed, and the explicit priority indicator may be multi-leveled to include two or more priority levels.

By way of further example, the precompiled code (e.g., precompiled JIT code) corresponding to the JavaScripts selected from the commonly-visited websites may be assigned a high-priority bit in an object header as compared to any other compiled code in the code cache 116, which may be assigned a normal-priority bit. In these implementations, the garbage collection component 118 algorithm in the JavaScript engine 114 collects the normal-priority precompiled objects first, and only collects the high-priority precompiled objects if no other alternatives are available (e.g., in case of a low memory situation). It should be noted that the normal-priority and high-priority approach is a specific example of a customized version of the general multi-priority approach when there are only two priority levels. When more fine-grained (e.g., more than 2 levels) priority levels are available, the JavaScript engine 114 starts collection of the lowest priority compiled code objects first. This type of priority mechanism to differentiate among the precompiled code objects enables the precompiled code objects for the selected scripts from commonly visited websites to live sufficiently long such that they can be directly executed when the user visits the websites they belong to—without the need to compile them.

In other variations, the precompiled code may be stored in another location that is not prone to garbage collection activity. For example, the precompiled code may be stored in the network cache 106, a portion of the heap of the JavaScript engine 114 (e.g., a portion of the code cache 116) that is explicitly reserved for precompiled code (also referred to herein as higher priority compiled code objects), or other available memory. In the instances where precompiled code is distinguished from other compiled code by explicitly reserving space for higher priority compiled code objects in the code cache 116, a custom garbage collection policy may be used for the higher priority compiled code objects.

By explicitly assigning a high-priority to the precompiled code as discussed above, or implicitly assigning a priority to precompiled code by saving the precompiled code in a memory separate from the code cache 116, the precompiled code is distinguished from other compiled code so that the precompiled code is persistently stored when the browser 104 is closed and after other websites are visited.

In addition to precompiling JavaScript code, in other modes of operation, the JavaScript engine 114 depicted in FIG. 1 operates in close connection with the browser core 110 as a typical JavaScript engine to compile JavaScript code as it is experienced by the browser core 110. For example, during parsing of an HTML webpage, the JavaScript engine 114 receives JavaScript code (e.g., in a stringified form), generates compiled code (e.g., for execution by a processor of the communication device 100), and allocates space for data objects during run time.

Many embodiments of the present invention are most effective for browsers that use just-in-time compilers that employ a compilation technology for a major part of the script code, implying that there is sufficient opportunity of improvement by doing the compilation ahead of time. Thus the traditional just-in-time compilers that compile everything and the HotSpot just-in-time compilers that utilize different levels of compilation technology without much interpretation are the most benefited.

Figure 2:
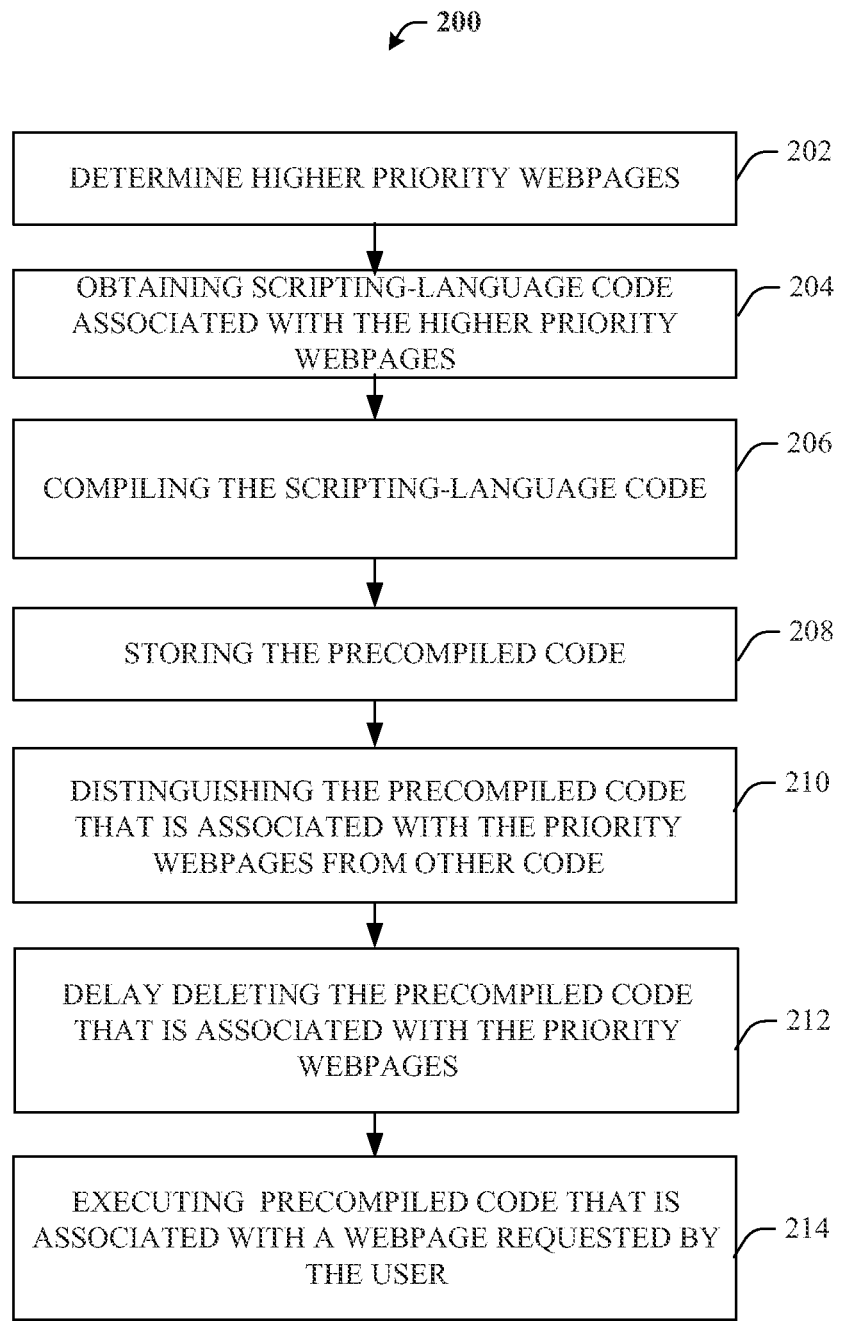
FIG. 2 illustrates a flowchart depicting operations that may be carried out in connection with the communication device depicted in FIG. 1.

While referring to FIG. 1, simultaneous reference is made to FIG. 2, which is a flowchart depicting a method for expediting the execution of scripting-language code in webpages. Although reference is made to the particular embodiment described with reference to FIG. 1, the described method may be traversed in connection with other embodiments.

As shown in FIG. 2, the preemptive compilation component 112 accesses the history store 108 to identify higher-priority webpages (e.g., frequently visited webpages and/or recently visited webpages)(Block 202), and scripting-language code (e.g., JavaScript code) that is associated with the higher-priority webpages is obtained from the network cache 106 (Block 204). In some modes of operation for example, when the communication device 100 and/or browser 104 are inactive, the preemptive compilation component 112 may access the network cache 106 to obtain scripting-language code (in stringified form) of the higher-priority webpages. In other modes of operation, the higher priority scripting-language code is obtained in connection with a webpage that is being rendered in response to a user request for the webpage.

In other words, the higher-priority stringified scripting-language code may be obtained by proactively parsing webpages in advance of a user requesting the webpages (e.g., based upon web browsing history) and/or the higher priority stringified scripting-language code may be obtained during the course of ordinary web browsing.

Regardless of how the higher-priority scripting-language code is obtained, the higher-priority scripting-language is then compiled (e.g., by the JavaScript engine 114) (Block 206), and the higher-priority compiled code is persistently stored and distinguished from other compiled code (Blocks 208 and 210). As a consequence of being distinguished (e.g., by implicit or explicit prioritization), deletion of the higher priority compiled code may be delayed so that from a later-in-time-perspective, when a webpage that includes the stringified scripting-language code (that is associated with the precompiled code) is visited, the precompiled code is available for execution (Block 212). As discussed above, the precompiled code may be differentiated from other compiled code by adding an explicit priority indicator to the precompiled code, or alternatively, the precompiled code may be saved in a location that is separated from other compiled code to implicitly prioritize the higher-priority compiled code objects.

Thus, the differentiation of the higher-priority compiled code objects from other compiled code objects—regardless of whether the higher-priority compiled code was compiled during ordinary web browsing or proactively compiled apart from a user's web browsing—enables the higher priority compiled code objects to be stored so as to avoid the garbage collection that removes lower-priority compiled code objects. In this way, when the user requests a webpage, the precompiled version of the scripting-language code in the webpage is directly executed because the scripting-language code in the webpage is already compiled.

The above-described methodology can be extended to lazily compiled JavaScripts for a Lazy JavaScript JIT compiler (e.g., the Google v8 engine). Lazy compiled JavaScript codes are those that get compiled only on an as-needed basis during execution. The above-described methodology details the up-front compilation and the time saved by precompiling the up-front JavaScript code. But additional benefits are also possible if the above-described methodology is extended to lazy compiled JavaScript code.

This can be achieved by maintaining information about the time critical lazy compiled code for a particular script of a commonly-visited website. For example, this information can be maintained in the network cache 106 in an encoded form with the dependency information of the specific JavaScript resources in a web page. These lazy compiled code fragments can be precompiled; thus saving more compilation times during running JavaScripts in the commonly-visited web pages.

Figure 3:
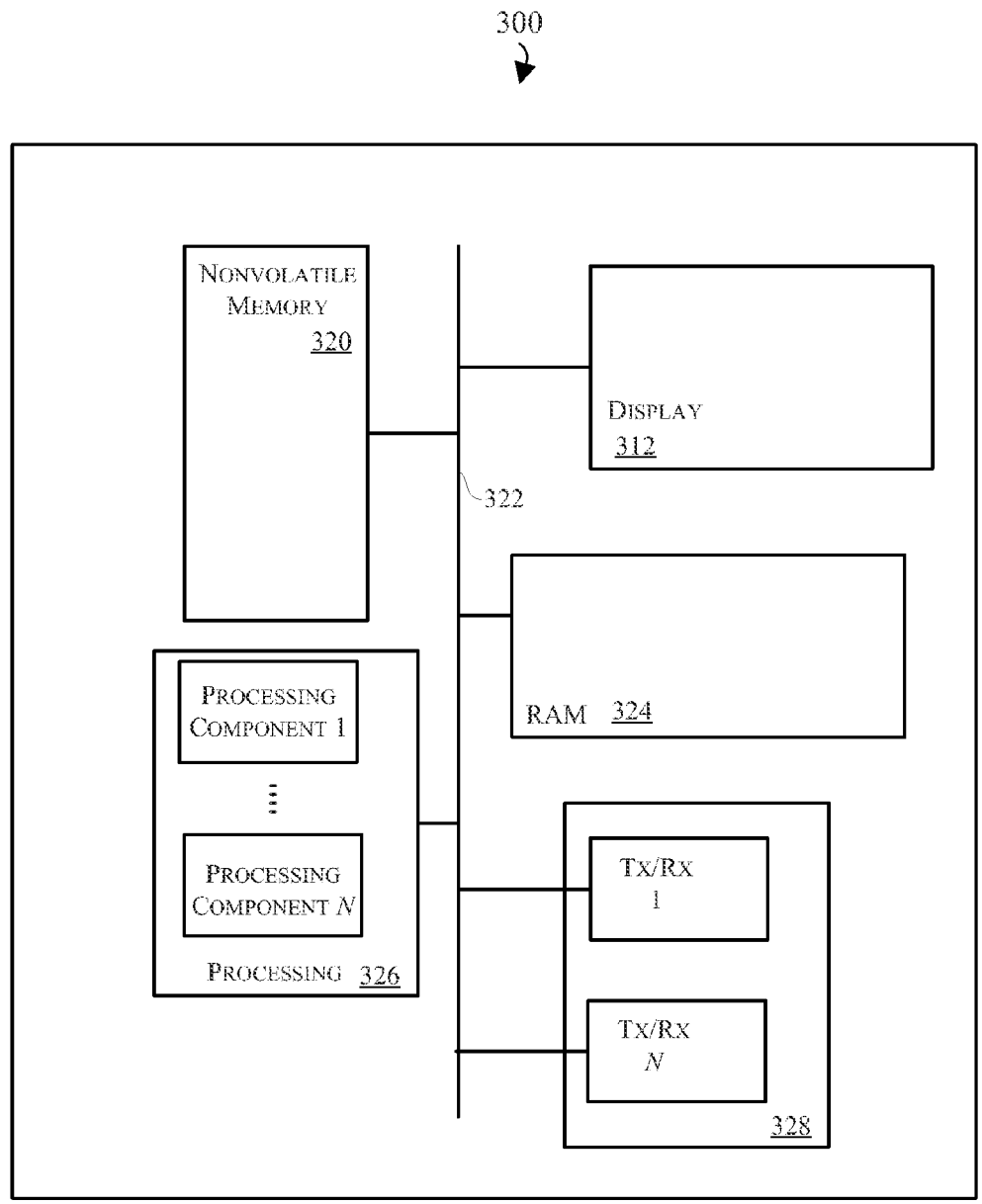
FIG. 3 is a block diagram depicting physical components of an exemplary communication device.

Referring next to FIG. 3, shown is a block diagram depicting physical components of an exemplary communication device 300 that may be utilized to realize the communication device 100 described with reference to FIG. 1. As shown, the communication device 300 in this embodiment includes a display 312, and nonvolatile memory 320 that are coupled to a bus 322 that is also coupled to random access memory ("RAM") 324, N processing components 326, and a transceiver component 328 that includes N transceivers. Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 312 generally operates to provide a presentation of content to a user, and may be realized by any of a variety of displays (e.g., CRT, LCD, HDMI, micro-projector and OLED displays). And in general, the nonvolatile memory 320 functions to store (e.g., persistently store) data and executable code including code that is associated with the functional components depicted in FIG. 1. In some embodiments for example, the nonvolatile memory 320 includes bootloader code, modem software, operating system code, file system code, and code to facilitate the implementation of one or more portions of the browser 104, browser core 110, the preemptive compilation component 112, and the JavaScript engine 114 discussed in connection with FIG. 1 as well as other components well known to those of ordinary skill in the art that are not depicted nor described in connection with FIG. 1 for simplicity.

In many implementations, the nonvolatile memory 320 is realized by flash memory (e.g., NAND or ONENANDTM memory), but it is certainly contemplated that other memory types may be utilized as well. Although it may be possible to execute the code from the nonvolatile memory 320, the executable code in the nonvolatile memory 320 is typically loaded into RAM 324 and executed by one or more of the N processing components 326. In many implementations, the network cache 106 and the history store 108 reside in the nonvolatile memory 320.

The N processing components 326 in connection with RAM 324 generally operate to execute the instructions stored in nonvolatile memory 320 to effectuate the functional components depicted in FIG. 1. For example, the code cache 116 may reside in RAM 324 and the precompiled code may be executed by one or more of the N processing components 326. As one of ordinarily skill in the art will appreciate, the N processing components 326 may include an application processor, a video processor, modem processor, DSP, graphics processing unit (GPU), and other processing components.

The transceiver component 328 includes N transceiver chains, which may be used for communicating with the network described with reference to FIG. 1. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for processing webpages, the method comprising:
   requesting, from a communication device, webpages from remote servers;
   receiving the webpages at the communication device;
   caching resources of the webpages in a network cache of the communication device so the resources do not have to be retrieved from the remote servers a next time the webpages are requested, the resources including scripting-language code;
   rendering the webpages on the communication device;
   determining at least one of the webpages is a higher-priority webpage that is more likely than others of the webpages to be requested again;
   retrieving, when the communication device is idle, a selected portion of the scripting language code from the network cache, wherein the selected portion of the scripting language code is utilized by the higher-priority webpage;
   compiling the selected portion of the scripting-language code to generate higher-priority compiled code objects;
   storing the higher-priority compiled code objects on the communication device;
   distinguishing the higher-priority compiled code objects from other compiled code objects that are stored on the communication device to delay the higher-priority compiled code objects from being removed from the communication device;
   removing the other compiled code objects from the communication device while retaining the higher-priority compiled code objects on the communication device; and
   executing the higher-priority compiled code objects when the higher-priority webpage is requested by the user.

2. The method of claim 1 including: determining whether the higher-priority compiled code objects that are stored on the communication device have to be garbage collected by assessing whether the scripting-language code that is associated with the higher-priority compiled code objects has expired by checking time-to-live information from the network cache.

3. The method of claim 1, including:
   identifying higher-priority webpages based upon a webpage-request history.

4. The method of claim 3, including creating a multi-level priority ordering of the higher-priority webpages based upon the webpage-request history.

5. The method of claim 4, including assigning different priorities to different scripting-language code within a single particular webpage.

6. The method of claim 5, including assigning the different priorities to the different scripting-language code within the single particular webpage based upon an extent that the different scripting-language code is shared among different webpages.

7. The method of claim 1, wherein distinguishing the higher-priority compiled code objects from the other compiled code objects includes storing the higher-priority compiled code objects in connection with a multi-level priority indicator that indicates the higher-priority compiled code objects should be retained with a higher priority than the other compiled code objects.

8. The method of claim 7 including: removing selected ones of the higher-priority compiled code objects, starting with lowest-priority compiled code objects, if memory pressure occurs after garbage collection has collected all non-priority compiled code objects so as to enable a level of stored higher-priority compiled code objects to be gradually reduced responsive to the memory pressure.

9. The method of claim 1, wherein distinguishing the higher-priority compiled code objects from the other compiled code objects includes storing the higher-priority compiled code objects in a first persistent memory location that is separate from another memory location where the other compiled code objects are stored, the first persistent memory location is a memory location that is not cleared by a garbage collection operation and is not cleared during a reboot of the communication device.

10. A communication apparatus, the communication apparatus comprising:
   means for requesting, from the communication apparatus, webpages from remote servers;

means for receiving the webpages at the communication apparatus;

means for caching resources of the webpages in a network cache of the communication apparatus so the resources do not have to be retrieved from the remote servers a next time the webpages are requested, the resources including scripting-language code;

means for rendering the webpages on the communication device;

means for determining at least one of the webpages is a higher-priority webpage that is more likely than others of the webpages to be requested again;

means for retrieving, when the communication apparatus is idle, a selected portion of the scripting language code from the network cache, wherein the selected portion of the scripting language code is utilized by the higher-priority webpage;

means for compiling the selected portion of the scripting-language code to generate higher-priority compiled code objects;

means for storing the higher-priority compiled code objects on the communication apparatus;

means for distinguishing the higher-priority compiled code objects from other compiled code objects that are stored on the communication apparatus to delay the higher-priority compiled code objects from being removed from the communication apparatus;

means for removing the other compiled code objects from the communication device while retaining the higher-priority compiled code objects on the communication device; and means for executing the higher-priority compiled code objects when the higher-priority webpage is requested by the user.

11. The communication apparatus of claim 10 including means for determining whether the higher-priority compiled code objects that are stored on the communication apparatus have to be garbage collected by assessing whether the scripting-language code that is associated with the higher-priority compiled code objects has expired by checking time-to-live information from the network cache.

12. The communication apparatus of claim 10 including:
means for identifying higher-priority webpages based upon a webpage-request history.

13. The communication apparatus of claim 12 including means for creating a multi-level priority ordering of the higher-priority webpages based upon the webpage-request history.

14. The communication apparatus of claim 13 including means for assigning different priorities to different scripting-language code within a single particular webpage.

15. The communication apparatus of claim 14 including means for assigning the different priorities to the different scripting-language code within the single particular webpage based upon an extent that the different scripting-language code is shared among different webpages.

16. The communication apparatus of claim 10, wherein the means for distinguishing the higher-priority compiled code objects from the other compiled code objects includes means for storing the higher-priority compiled code objects in connection with a multi-level priority indicator that indicates the higher-priority compiled code objects should be retained with a higher priority than the other compiled code objects.

17. The communication apparatus of claim 16 including means for removing selected ones of the higher-priority compiled code objects, starting with lowest-priority compiled code objects, if memory pressure occurs after garbage collection has collected all non-priority compiled code objects so as to enable a level of stored higher-priority compiled code objects to be gradually reduced responsive to the memory pressure.

18. The communication apparatus of claim 10, wherein the means for distinguishing the higher-priority compiled code objects from the other compiled code objects includes means for storing the higher-priority compiled code objects in a first persistent memory location that is separate from another memory location where the other compiled code objects are stored, the first persistent memory location is a memory location that is not cleared by a garbage collection operation and is not cleared during a reboot of the communication apparatus.

19. A non-transitory, tangible computer readable storage medium, encoded with processor readable instructions to perform a method for obtaining web content on a communication device, the method comprising:
requesting, from the communication device, webpages from remote servers;
receiving the webpages at the communication device;
caching resources of the webpages in a network cache of the communication device so the resources do not have to be retrieved from the remote servers a next time the webpages are requested, the resources including scripting-language code;
rendering the webpages on the communication device;
determining at least one of the webpages is a higher-priority webpage that is more likely than others of the webpages to be requested again;
retrieving, when the communication device is idle, a selected portion of the scripting language code from the network cache, wherein the selected portion of the scripting language code is utilized by the higher-priority webpage;
compiling the selected portion of the scripting-language code to generate higher-priority compiled code objects;
storing the higher-priority compiled code objects on a communication device;
distinguishing the higher-priority compiled code objects from other compiled code objects that are stored on the communication device to delay the higher-priority compiled code objects from being removed from the communication device;
removing the other compiled code objects from the communication device while retaining the higher-priority compiled code objects on the communication device; and
executing the higher-priority compiled code objects when the higher-priority webpage is requested by the user.

20. The non-transitory, tangible computer readable storage medium of claim 19, the method including: determining whether the higher-priority compiled code objects that are stored on the communication device have to be garbage collected by assessing whether the scripting-language code that is associated with the higher-priority compiled code objects has expired by checking time-to-live information from the network cache.

21. The non-transitory, tangible computer readable storage medium of claim 19, the method including: identifying higher-priority webpages based upon a webpage-request history.

22. The non-transitory, tangible computer readable storage medium of claim 21, the method including creating a multi-level priority ordering of the higher-priority webpages based upon the webpage-request history.

23. The non-transitory, tangible computer readable storage medium of claim 22, the method including assigning different priorities to different scripting-language code within a single particular webpage.

24. The non-transitory, tangible computer readable storage medium of claim 23, the method including assigning the different priorities to the different scripting-language code within the single particular webpage based upon an extent that the different scripting-language code is shared among different webpages.

25. The non-transitory, tangible computer readable storage medium of claim 19, wherein distinguishing the higher-priority compiled code objects from the other compiled code objects includes storing the higher-priority compiled code objects in connection with a multi-level priority indicator that indicates the higher-priority compiled code objects should be retained with a higher priority than the other compiled code objects.

26. The non-transitory, tangible computer readable storage medium of claim 25 the method including: removing selected ones of the higher-priority compiled code objects, starting with lowest-priority compiled code objects, if memory pressure occurs after garbage collection has collected all non-priority compiled code objects so as to enable a level of stored higher-priority compiled code objects to be gradually reduced responsive to the memory pressure.

27. The non-transitory, tangible computer readable storage medium of claim 19, wherein distinguishing the higher-priority compiled code objects from the other compiled code objects includes storing the higher-priority compiled code objects in a first persistent memory location that is separate from another memory location where the other compiled code objects are stored, the first persistent memory location is a memory location that is not cleared by a garbage collection operation and is not cleared during a reboot of the communication device.

28. An apparatus for processing webpages, the apparatus comprising:
   a browser to request and receive webpages from remote servers;
   a network cache to cache resources of the webpages so the resources do not have to be retrieved from the remote servers a next time the webpages are requested, the resources including scripting-language code;
   memory to store compiled code objects;
   a preemptive compilation component configured to obtain, when the communication device is idle, a selected portion of the scripting-language code from the network cache that is utilized by a higher-priority webpage;
   a scripting-language engine configured to:
      compile scripting-language code to generate higher-priority compiled code objects;
      store the higher-priority compiled code objects in the memory; and
      distinguish the higher-priority compiled code objects from other compiled code objects that are stored in the memory; and
   a garbage collection component that includes a priority check portion to remove the other compiled code objects from the memory while retaining the higher-priority compiled code objects in the memory so the higher-priority compiled code objects do not have to be compiled a next time the higher-priority webpage is requested.

29. The apparatus of claim 28 wherein the garbage collection component is configured to determine whether the higher-priority compiled code objects that are stored on the communication device have to be garbage collected by assessing whether the scripting-language code that is associated with the higher-priority compiled code objects has expired by checking time-to-live information from the network cache.

30. The apparatus of claim 28, wherein the preemptive compilation component identifies higher-priority webpages based upon a webpage-request history.

31. The apparatus of claim 30, wherein the preemptive compilation component creates a multi-level priority ordering of the higher-priority webpages based upon the webpage-request history.

32. The apparatus of claim 31, wherein the preemptive compilation component assigns different priorities to different scripting-language code within a single particular webpage.

33. The apparatus of claim 32, wherein the preemptive compilation component assigns the different priorities to the different scripting-language code within the single particular webpage based upon an extent that the different scripting-language code is shared among different webpages.

34. The apparatus of claim 28, wherein the scripting-language engine distinguishes the higher-priority compiled code objects from the other compiled code objects by storing the higher-priority compiled code objects in connection with a multi-level priority indicator that indicates the higher-priority compiled code objects should be retained with a higher priority than the other compiled code objects.

35. The apparatus of claim 34, wherein the garbage collection component is configured to remove selected ones of the higher-priority compiled code objects, starting with lowest-priority compiled code objects, if memory pressure occurs after garbage collection has collected all non-priority compiled code objects to enable a level of stored higher-priority compiled code objects to be gradually reduced responsive to the memory pressure.

36. The apparatus of claim 28, wherein the scripting-language engine distinguishes the higher-priority compiled code objects from the other compiled code objects by storing the higher-priority compiled code objects in a first persistent memory location that is separate from another memory location where the other compiled code objects are stored, the first persistent memory location is a memory location that is not cleared by a garbage collection operation and is not cleared during a reboot of the communication device.

* * * * *